(12) United States Patent
Laliberte (10) Patent No.: US 8,074,602 B2
(45) Date of Patent: Dec. 13, 2011

(54) FOOD DISPENSER

(76) Inventor: Jean-Charles Laliberte, Ste-Claire (CA)

(*) Notice: Subject to any disclaimer, the term of this patent is extended or adjusted under 35 U.S.C. 154(b) by 211 days.

(21) Appl. No.: 12/588,599

(22) Filed: Oct. 21, 2009

(65) Prior Publication Data

US 2010/0095895 A1    Apr. 22, 2010

(30) Foreign Application Priority Data

Oct. 21, 2008  (GB) .................................. 0819220.5

(51) Int. Cl.
*A01K 5/02* (2006.01)
(52) U.S. Cl. ..................................... 119/57.92; 119/61.2
(58) Field of Classification Search ............... 119/57.92, 119/51.12, 51.01, 51.04, 52.1, 53, 57, 61.2; 221/258, 277; 222/251
See application file for complete search history.

(56) References Cited

U.S. PATENT DOCUMENTS

| | | | |
|---|---|---|---|
| 2,500,243 A | 3/1950 | Dixon | |
| 3,927,774 A * | 12/1975 | Teske et al. ................... | 414/323 |
| 3,946,702 A | 3/1976 | Mazzini | |
| 3,955,537 A | 5/1976 | Yujiri | |
| 4,020,980 A | 5/1977 | Illes, Jr. | |
| 4,039,118 A | 8/1977 | Kawaoka | |
| 4,175,679 A | 11/1979 | Ponce et al. | |
| 4,242,985 A | 1/1981 | Freeborn | |
| 4,279,220 A | 7/1981 | Kukurba | |
| 4,292,930 A * | 10/1981 | Olsen ......................... | 119/51.11 |
| 4,324,203 A | 4/1982 | Chiappetti | |
| 4,492,183 A | 1/1985 | Chiotasso et al. | |
| 4,513,688 A | 4/1985 | Fassauer | |
| 4,735,171 A * | 4/1988 | Essex ........................ | 119/51.12 |
| 4,770,125 A | 9/1988 | Gold et al. | |
| 4,829,935 A | 5/1989 | Gray | |
| 4,922,857 A * | 5/1990 | Arentoft ..................... | 119/51.12 |
| 5,085,173 A | 2/1992 | Powers | |
| 5,333,572 A * | 8/1994 | Nutt ........................... | 119/57.91 |
| 5,605,251 A * | 2/1997 | Retti ................................ | 222/1 |
| 5,626,260 A * | 5/1997 | Waldner ....................... | 222/144 |
| 5,964,184 A * | 10/1999 | Hart ............................ | 119/57.1 |
| 6,135,056 A | 10/2000 | Kuo | |
| 6,427,628 B1 * | 8/2002 | Reece ........................ | 119/51.11 |
| 6,446,574 B2 | 9/2002 | Bickley | |
| 6,575,117 B1 * | 6/2003 | Rasmussen .................. | 119/57.1 |
| 6,666,167 B1 | 12/2003 | Carlson | |
| 6,681,718 B1 | 1/2004 | McLlaky | |
| 6,789,503 B1 | 9/2004 | Gao | |
| 6,988,465 B2 | 1/2006 | Park | |
| 7,185,648 B1 * | 3/2007 | Rand ........................ | 128/200.23 |
| 7,222,583 B2 * | 5/2007 | Foster et al. ................ | 119/57.91 |
| 7,228,816 B2 | 6/2007 | Turner et al. | |
| 7,270,081 B2 | 9/2007 | Park | |
| 7,395,782 B1 | 7/2008 | Lindsay | |
| 2004/0194714 A1 | 10/2004 | Lee | |
| 2005/0061252 A1 | 3/2005 | Meeks et al. | |

* cited by examiner

*Primary Examiner* — Yvonne R. Abbott (57) ABSTRACT

A food dispenser for dispensing dry food, the food dispenser comprising: a food receiving module for receiving the food; a metering module for metering a quantity of the food to dispense, the metering module including an impeller having at least one arm defining a vane, the impeller being rotatably mounted in the metering module, the metering module also including a power drive unit operatively coupled to the impeller for selectively rotating the impeller; a discharge module operatively coupled to the output port for receiving the food from the output port and dispensing the food; an impeller rotation detector operatively coupled to the impeller for detecting a rotation of the impeller when the power drive unit is used to rotate the impeller. The metering module is configured and sized to discharge a predetermined quantity of the food when the impeller rotates over a predetermined rotation angle. The impeller rotation detector detects that the impeller has rotated over the predetermined rotation angle after the power drive unit has been energized to detect dispensing of the predetermined quantity of the food.

20 Claims, 3 Drawing Sheets

FOOD DISPENSER

This application claims priority from GB Patent Application Number 0819220.5 on Oct. 21, 2008.

FIELD OF THE INVENTION

The present invention relates generally to food dispensers and, more particularly, to an automatic dry food dispenser for feeding animals.

BACKGROUND

Automatic food dispenser for feeding animals, such as automatic dispensers specifically designed for pet animals, as well as the more sturdy type designed for industrial husbandry, are known in the art and are useful for automatically dispensing food material, such as pelletized or powdered dry food to animals.

Such automatic food dispensers of the prior art generally comprise three main elements: a container, or hopper compartment, for temporarily storing the dry food to be dispensed to the intended animal, a power driven feed transfer chamber for dispensing a metered amount, or ration, of dry food on a timely basis, and a conveying means for conveying the dispensed ration to a suitable receptacle such as a feed bowl. The feed transfer chamber generally comprises a rotating element such as, for examples, a rake, a daisy wheel, an auger, or the like, that dispenses dry food from an input port in communication with the hopper compartment, to an output port in communication with the conveying means.

While these prior art devices generally offer an automatic food dispenser for dispensing dry food to animals, they also entail one or more of the following disadvantages:

a) they are generally specifically adapted for only one type of dry food material for animals, either pelletized or powdered/granulated dry food;

b) their mode of operation for dispensing predetermined amount of feed is generally based on a timed operation of a rotating element within the dispenser, and without monitoring means on the actual dispensing of the food;

c) they are generally not readily designed to be quickly and easily disassembled for periodic cleaning. Thus, moisture trapped in dry food dust accumulated in compact mechanical assemblies of the dispenser is prone to develop mould, a generally unacceptable problem in industrial husbandry of animals destined for human consumption.

Against this background, there exists a need for a new and improved food dispenser. It is a general object of the present invention to provide a new and improved food dispenser for dispensing dry food.

SUMMARY OF THE INVENTION

In a broad aspect, the invention provides a food dispenser for dispensing dry food, the food dispenser comprising: a food receiving module for receiving the food; a metering module for metering a quantity of the food to dispense, the metering module defining a metering module upper wall, a substantially opposed metering module lower wall and a metering module peripheral wall extending therebetween, the metering module upper wall defines two substantially opposed input ports operatively coupled to the food receiving module for receiving the food therefrom, and the metering module lower wall defining two substantially opposed output ports for releasing the food, the output ports being substantially offset from the input ports when the food dispenser is in an operative configuration for preventing a direct flow of the food between the input and output ports, the metering module including an impeller having at least one arm defining a vane, the impeller being rotatably mounted between the metering module upper and lower walls for rotation in a plane substantially parallel to the metering module lower wall, the metering module also including a power drive unit operatively coupled to the impeller for selectively rotating the impeller; a discharge module operatively coupled to the output port for receiving the food from the output port and dispensing the food; a directing structure mounted in the food receiving module, the directing structure defining a pair of directing planes diverging from each other and each inclined toward a respective one of the input ports; and an impeller rotation detector operatively coupled to the impeller for detecting a rotation of the impeller when the power drive unit is used to rotate the impeller, the impeller rotation detector including a magnet mounted to the impeller for joint rotation therewith and a magnetic field sensor fixed with respect to the metering module upper and lower walls, the magnetic field sensor being positioned to be substantially in register with the magnet when the impeller reaches a predetermine rotation angle; wherein the metering module is configured and sized to discharge a predetermined quantity of the food when the impeller rotates over a predetermined rotation angle; whereby the impeller rotation detector detects that the impeller has rotated over the predetermined rotation angle after the power drive unit has been energized to detect dispensing of the predetermined quantity of the food.

According to an embodiment, which is particularly suitable for dispensing pelletized dry food, the automatic food dispenser is generally represented by an axially upright, substantially cylindrical assembly comprising a food receiving module, such as a hopper module, occupying the top portion, followed by a metering module occupying the middle portion, and a discharge module occupying the bottom portion.

The food receiving module represents a container or compartment for temporarily storing the animal feed to be dispensed and comprises an open-ended cylindrical body closed at its top end by a removable lid. In alternative embodiments, the food receiving module receives food from a food conveying system, which is particularly suitable in industrial farming contexts.

The metering module is generally represented by an assembly comprising a directing structure on top of a relatively short cylindrical chamber. The cylindrical chamber houses a star-shaped feed impeller and has a power drive unit fastened to its underside to drive the impeller coupled to the output drive shaft of the power drive unit. The cylindrical chamber is further provided with a top input port in communication with the top hopper module, and an output port in communication with the bottom discharge module.

The discharge module is basically a funnel-shaped housing that conveys the dispensed feed to a suitable receptacle such as a feed bowl.

Thus, as the power drive unit is energized and the feed impeller rotates, the cylindrical chamber acts as a feed transfer chamber with the rotating arms of the feed impeller acting as rotating wipers that dispense food material from the gravity urged food falling through the input port to the output port of the chamber.

Furthermore, a magnetic field sensor is fastened at a suitable position to the underside of the cylindrical chamber to detect the passing of a magnetic element, such as a magnet, fastened or embedded in one extending arm of the feed impeller as it rotates.

Typically, the food dispenser of the present invention has its power drive unit and magnetic field sensor linked by electrical cables to a remote electronic control unit provided with a scheduling program module for allowing an operator to define the feed schedule of the animal such as, for example, the time of day and quantity of the rations that is based on the number of turns of the feed impeller rather then on a time based operation. Furthermore, the electronic control unit is also preferably provided with a monitoring program module that can detect an error condition of the metering module through the monitoring of the magnetic field sensor.

The three main modules of the dispenser, namely the food containing module, the metering module and the discharge module, have their adjoining ends compatibly configured such that they are easily manually assembled by simply inserting one on top of the other in a coffee cup fashion, with the discharge module at the bottom representing the stationary module that supports the two other modules on top of the latter.

In turn, the metering module is easily disassembled and reassembled using ordinary hand tools such as a screwdriver and a pair of pliers.

In use, the food containing module is filled with pelletized dry food and the automatic food dispenser is then activated through a feed schedule programmed into the electronic control unit.

In an alternate embodiment optimized for dispensing powdered dry food material instead of pelletized dry food, the directing structure of the metering module is replaced with a rotating stirrer arm coupled to an upwardly protruding portion of the output driving shaft projecting upwardly from the top of the transfer feed chamber. Thus, the rotating stirrer arm mainly inhibit the clogging of the powdered food material that may form above the input port of the cylindrical chamber of the dispenser.

Some advantages of the present invention are to provide an automatic food dispenser:

a) which is quickly and easily optimizable for pelletized or powdered dry food intended for animal husbandry;

b) whose magnetic field sensor for monitoring the rotation of the feed impeller within the automatic food dispenser allows for repeatably accurate dispensing of feed rations to the intended animal, as well as allowing the detection of any erroneous operation of the feed impeller;

c) whose quick and easy disassembly and reassembly procedure renders the food dispenser easy to clean, an advantage particularly appreciated by the animal husbandry industry;

d) which is relatively simple and economical to produce.

In another broad aspect, the invention provides a food dispenser for dispensing dry food, the food dispenser comprising: a food receiving module for receiving the food; a metering module for metering a quantity of the food to dispense, the metering module defining a metering module upper wall, a substantially opposed metering module lower wall and a metering module peripheral wall extending therebetween, the metering module upper wall defining an input port operatively coupled to the food receiving module for receiving the food therefrom, the metering module lower wall defining an output port for releasing the food, the output port being substantially offset from the input port when the food dispenser is in an operative configuration for preventing a direct flow of the food between the input and output ports, the metering module including an impeller having at least one arm defining a vane, the impeller being rotatably mounted between the metering module upper and lower walls for rotation in a plane substantially parallel to the metering module lower wall, the metering module also including a power drive unit operatively coupled to the impeller for selectively rotating the impeller; a discharge module operatively coupled to the output port for receiving the food from the output port and dispensing the food; an impeller rotation detector operatively coupled to the impeller for detecting a rotation of the impeller when the power drive unit is used to rotate the impeller. The metering module is configured and sized to discharge a predetermined quantity of the food when the impeller rotates over a predetermined rotation angle. The impeller rotation detector detects that the impeller has rotated over the predetermined rotation angle after the power drive unit has been energized to detect dispensing of the predetermined quantity of the food.

Other objects, advantages and features of the present invention will become more apparent upon reading of the following non-restrictive description of preferred embodiments thereof, given by way of example only with reference to the accompanying drawings.

DETAILED DESCRIPTION

Figure 1:
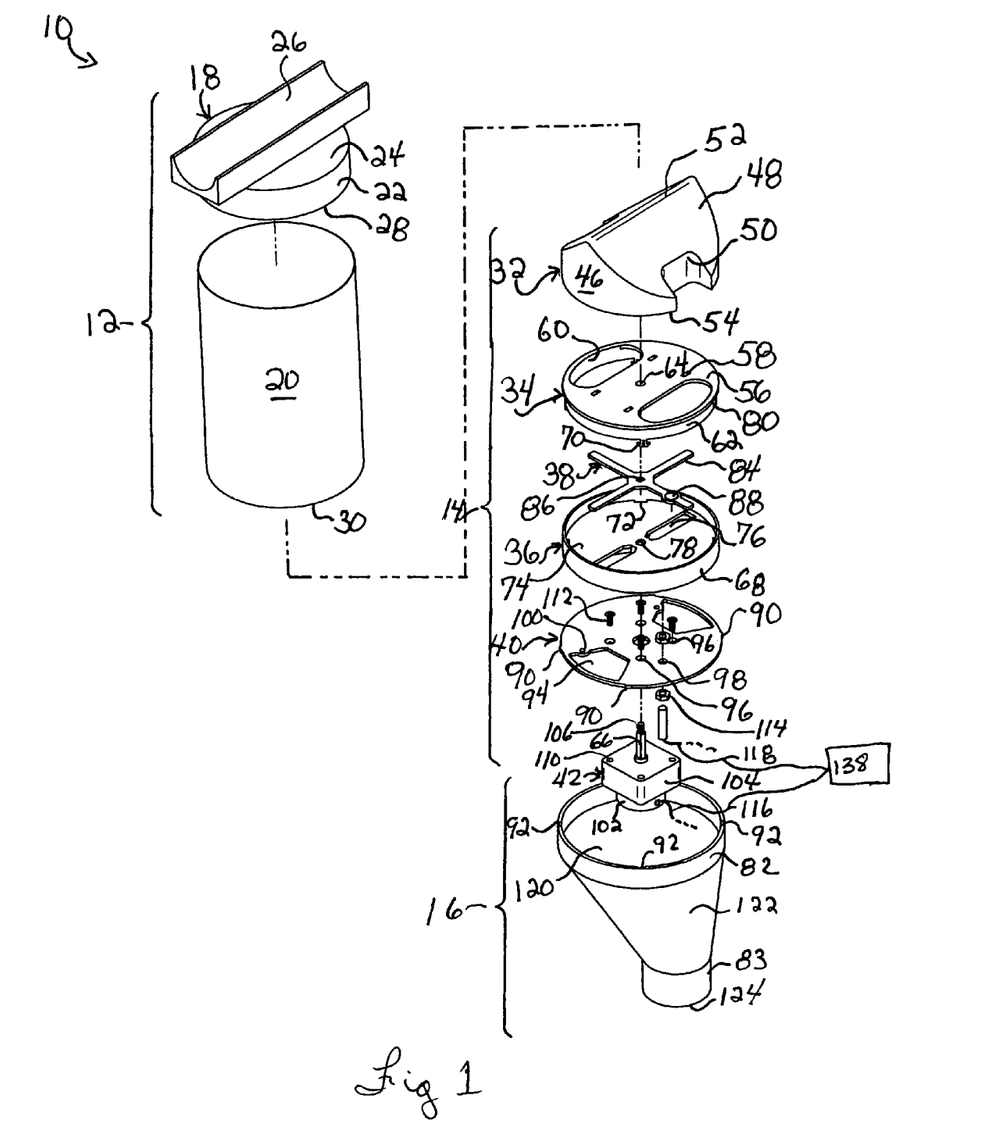
FIG. 1, in an exploded, perspective, view, illustrates a food dispenser according to an embodiment of the present invention, here shown configured to dispense pelletized dry food.

FIG. 1 shows an embodiment of the food dispenser 10 of the present invention that is configured for optimized dispensing of pelletized dry food (not shown in the drawings) for animals. The food dispenser 10 generally comprises a food receiving module 12 for receiving the food, a metering module 14 for metering a quantity of the food to dispense, and a discharge module 16 operatively coupled to the metering module 14 for receiving the food from the food metering module 14 and dispensing the food, for example by conveying the dispensed food into a suitable receptacle such as a feed dish or the like (not shown). In some embodiments of the invention, as shown in FIG. 1, the food receiving module 12 takes the form of a hopper module for temporarily storing animal feed to be dispensed.

The food receiving module 12 generally consists of a removable cover 18 and an upstanding, open-ended cylindrical body 20. The cover 18 is represented by a cylindrical side wall 22 closed at a top end 24 and crowned with a handle member 26. The inner diameter of the open bottom end 28 of the cover 18 is suitably sized such that the latter may be freely slided on top of the open-ended cylindrical body 20. In turn, the inner diameter of the bottom open end 30 of the cylindrical body 20 is suitably sized to be slided in a snug-fit relationship over a top portion of the metering module 14, which is described hereinafter.

The metering module 14 generally consists of a directing structure 32, a pair of correspondingly engaging substantially opposed, substantially planar and substantially parallel cylindrical metering module upper and lower elements 34 and 36, an impeller 38 rotatably mounted between the metering module upper and lower elements 34 and 36 for rotation in a plane substantially parallel to the metering module lower element 36, a base plate 40, a power drive unit 42, for example including a motor, and a magnetic field sensor 44. An impeller rotation detector, for example in the form of a combination magnetic field sensor 44 and a magnet 88, is operatively coupled to the impeller 38 for detecting a rotation of the impeller 38 when the impeller rotates. The metering module 14 is configured and sized to discharge a predetermined quantity of the food when the impeller 38 rotates over a predetermined rotation angle. The impeller rotation detector detects that the impeller 38 has rotated over the predetermined rotation angle after a power drive unit 42 has been energized to detect dispensing of the predetermined quantity of the food.

The directing structure 32 is generally defined by a relatively short upstanding cylindrical element 46 whose outer diameter is in register with the inner diameter of the bottom open end 30 of the food receiving module 12 such that the directing structure 32 may be slidably inserted therein preferably in a snug-fit relation. The directing structure 32 is therefore mounted in the food receiving module 12. The top portion of the directing structure 32 is closed with an inverted V-shaped configuration extending through a lateral cross-section of the cylindrical element 46 and, thus, defines a pair of oppositely disposed directing planes 48 each inclined toward a respective input port 60 of the metering module 14, which are described in further details hereinbelow. For example, the directing planes 48 are downwardly inclined towards the lower peripheral edge of the cylindrical element 46 at roughly 45 degree angle each. Furthermore, a pair of longitudinally oriented arc recesses 50 are provided through a pair of oppositely disposed peripheral portions of the cylindrical element 46 that coincide with the most distal peripheral portions of the directing planes 48 relative to the upper central ridge 52 of the directing structure 32.

The underside 54 of the directing structure 32 is rigidly and releasably secured to a metering module upper wall 56 of the metering module upper element 34 through a plurality of releasably snap-and-lock fastening elements (not shown) that are extending downwardly from the underside 54 of the directing structure 32. The fastening elements are in register with a correspondingly disposed number of compatible through slots 58 provided through the metering module upper wall 56 of the metering module upper element 34. The fastening elements and corresponding through slots 58 are configured such that when the directing structure 32 is mounted onto the metering module upper element 34, the arc recesses 50 are centrally positioned above a corresponding pair of input ports 60 provided through the metering module upper element 34.

Thus, the pair of oppositely disposed directing planes 48 and arc recesses 50 are for conveying the gravity urged flow of pelletized dry food towards the corresponding pair of input ports 60 of the metering module upper wall 56. The input ports 60 are substantially opposed to each other have a substantially half-circular configuration, with their arched portion oriented outwardly, and are relatively wider than their corresponding arc recesses 50 of the directing structure 32, and they are operatively coupled to the food receiving module 12 for receiving the food therefrom.

The metering module upper element 34 is generally defined by a relatively short cylindrical sidewall 62 closed at the top end by a disc-shaped metering module upper wall 56 provided with the pair of oppositely disposed input ports 60 and the through slots 58 as described above. The disc-shaped metering module upper wall 56 is further provided with a central hole 64 adapted to freely receive therein the rotatable drive shaft 66 of the power drive unit 42, which will be described in details more below. The disc-shaped metering module upper wall 56 has a diameter that is slightly greater than the diameter of the adjoining cylindrical wall 62, thus defining a relatively small protruding peripheral edge around the upper end periphery of the cover. In turn, the cylindrical wall 62 has an outer diameter that is slightly smaller than the inner diameter of the cylindrical sidewall 68 of the oppositely corresponding metering module lower element 36. The cylindrical sidewall 68 is therefore a metering module peripheral wall extending between the metering module upper and lower elements 34 and 36.

Furthermore, the lower peripheral edge of the metering module upper element 34 is provided with a plurality of downwardly extending snap and lock fastening elements 70, here shown in the form of pairs of spring biased L-shaped members, which are in register with a correspondingly disposed number of compatible through slots 72 provided along the inner peripheral edge of the metering module lower wall 74 of the metering module lower element 36.

The metering module lower element 36 is generally defined by a cylindrical sidewall 68 having roughly the same axial length as the cylindrical sidewall 62 of the metering module upper element 34 described above, and is closed at the bottom end by a disc-shaped metering module lower wall 74 provided with through slots 72 along its inner peripheral edge, also as described above. The metering module lower wall 74 is further provided with a pair of substantially oppositely disposed and radially extending elongated through slots, heretofore identified as output ports 76 used for releasing the food, the discharge module 16 being operatively coupled to the output ports 76 for receiving the food from the output ports 76 and dispensing the food. Likewise the metering module upper element 34, the metering module lower element 36 is also provided with a centered hole 78 adapted to freely receive therein the rotatable output drive shaft 66 of the power drive unit 42.

Once the oppositely corresponding metering module lower and upper elements 36 and 34 are assembled and releasably secured to one another in a snap and lock engagement in an operative configuration, their respective pairs of input ports 60 and output ports 76 are substantially offset from each other for preventing a direct flow of the food between the input and output ports 60 and 76. In other words, the food needs to be carried by the impeller 38 from the input port 60 to the output port 76 in order for the metering module 14 to discharge food. For example, the input and output ports 60 and 76 are offset by about 90 degrees angle. It is to be understood that the snap and lock fastening elements 70 and associated compatible through slots 72 arrangements between the metering module upper and lower elements 34 and 36, as well as between the directing structure 32 and the metering module upper element 34, may be replaced with any other suitable type of releasable fastening elements.

Furthermore, the protruding peripheral edge 80 and cylindrical sidewall 68 of the thus assembled metering module lower and upper elements 36 and 34 respectively define a uniform cylindrical surface whose top portion is in register with the bottom open end 30 of the food receiving module 12, and whose bottom portion is in register with the top cylindrical portion 82 of the discharge module 16 described more below. The thus assembled metering module upper and lower elements 34 and 36 generally form a transfer feed chamber housing the impeller 38 described hereinafter.

The impeller 38 has a substantially star-shaped configuration that is generally defined by a central hub surrounded by a plurality, but typically four radially extending arms 84 that are perpendicularly disposed from one another. The overall dimensions of the impeller 38 are slightly smaller than the dimensions of the inner cylindrical volume generally defined within the assembled metering module top and bottom elements 34 and 36 described above such that the impeller is thus freely rotatable therein. The central hub of the impeller 38 is provided with a substantially D-shaped central bore 86 for slidably and engagingly receiving therein, in a tight-fit relation, a correspondingly shaped cross-section of the output drive shaft 66 of the power drive unit 42.

Furthermore, at least one of the extending arms 84 is provided with a magnet 88 that is rigidly fastened to, or embedded in the arm at roughly a mid position along the length of the latter to provide an impeller rotation detector, which includes a magnet 88 mounted to the impeller 38 for joint rotation therewith. The magnet 88 is part of the impeller rotation detector. The purpose of the magnet 88 will be explained through the description of the operation mode of the food dispenser 10 more below.

The base plate 40 has a substantially circular shape having a diameter that is preferably identical to the outer diameter of the metering module lower element 36. Furthermore, there is a plurality, but preferably four alignment notches 90 that are equidistantly spaced apart and radially protruding from the peripheral circular edge of the base plate 40. The protruding alignment notches 90 are in register with a corresponding set of longitudinally aligned, elongated slotted grooves 92 along the inner top portion of the funnel shaped discharge module 16, and serve as rotational locking means between the base plate 40 and the discharge module 16.

The base plate 40 is further provided with a pair of oppositely disposed feed discharge holes 94 and a plurality of through holes 96 and 98 which are for respectively fastening the power drive unit 42 and a magnetic field sensor 44 to the underside of the plate so that the magnetic field sensor 44 is fixed with respect to the metering module upper and lower elements 34 and 36. The magnetic field sensor 44 is positioned to be substantially in register with the magnet 88 when the impeller 38 reaches the predetermine rotation angle.

Additional holes 100 in the base plate 40, cooperatively with a compatible set of screws (not shown) allow the plate to be rigidly fastened to the underside of the metering module lower element 36. The feed discharge holes 94 through the base plate 40 are relatively greater than the dispenser output ports 76 provided through the metering module lower element 36. Likewise the metering module upper and lower elements 34 and 36 described above, base plate 40 is provided with a centered hole for freely receiving therein the rotatable output drive shaft 66 of the power drive unit 42.

The power drive unit 42 is preferably represented by a relatively compact mechanical assembly consisting of an electric motor 102, a step-down gearbox 104 comprising a gear system provided between the motor 102 and the output drive shaft 66 for changing a rotation speed ratio between the electric motor 102 an the output drive shaft 66, and therefore of the impeller 38. The motor 102 and gearbox 104 are preferably configured such that the output drive shaft 66 has a relatively low rotational speed. For example, a rotational speed of about five revolutions per minute would be suitable.

The drive shaft 66 has a substantially D-shaped cross-section on substantially the full length of the latter except for a relatively short threaded portion 106 at its distal end. The length of the drive shaft 66 is configured such that the threaded portion 106 and a relatively small adjacent portion of the D-shaped shaft protrude from the metering module upper wall 56 of the metering module upper element 34 once the metering module 14 is fully assembled.

The D-shaped cross-section is for slidably engaging, in a tight-fit relation, into the correspondingly D-shaped through central bore 86 in the center hub of the impeller 38. It is to be noted that the cross-section of the output drive shaft 66 and correspondingly shaped central bore 86 through the hub of the impeller 38 may have any other suitable shape such as, for examples, hexagonal, square or the like, which can rotatably interlock the drive shaft 66 with the impeller 38.

The power drive unit 42 is provided with fastening means such as, for example, threaded holes 110 and compatible screws 112, for rigidly fastening the drive unit to the underside of the base plate 40 through correspondingly disposed holes 96 in the base plate 40.

A magnetic field sensor 44, such as a read switch or other magnetically activated component that detects the proximity of a magnet, is typically fastened to the underside of the base plate 40 through hole 98 provided in the base plate 40 using, for example, a pair of tightening nuts 114 on each side of the base plate 40. Furthermore, the hole 98 for the magnetic field sensor 44 is positioned at a corresponding radius from the center of the plate relative to the magnet 88 embedded in one of the extending arms 84 of the impeller 38 described above.

The power drive unit 42 and the magnetic field sensor 44 are both preferably linked to a controller 138 through a power cord 116 and an electrical signal cable 118 respectively. The purpose of the controller 138 is to suitably energize the power drive unit 42 based on predetermined conditions of the magnetic field sensor 44 to selectively rotate the impeller 38. The controller 138 unit may be integrated within, or located outside the food dispenser 10 with suitable apertures for the power cord 116 and the electrical signal cable 118 through, for example, a side wall portion of the discharge module 16. Furthermore, the controller 138 may control more than one food dispenser 10, such as in a typical industrial animal husbandry application.

Typically, the controller 138 is operatively coupled to the motor 102 for energizing the motor 102 when a predetermined condition is met, such as for example when a predetermined delay has elapsed since the motor 102 has been energized, or at predetermined times during the day, among other possibilities. Typically, the controller 138 is operatively coupled to the impeller rotation detector for energizing the motor 102 until the impeller 38 has rotated over a predetermined rotation angle, resulting in discharging of a predetermined quantity of food. Typically, the predetermined rotation angle is an integer number of impeller rotation. In some embodiments of the invention, the controller 138 issues an alarm if the predetermined rotation angle has not been reached within a predetermined motor activation duration. Examples of such alarms include lighting a warning light, emitting a sound, or sending an electrical or optical signal to a monitoring station, among other possibilities.

The metering module 14 is easily assembled by sequentially fastening the power drive unit 42 and magnetic field sensor 44 to the underside of the base plate 40, followed by fastening the base plate 40 to the underside of the metering module lower element 36, followed with sliding the impeller 38 onto the thus protruding D-shaped output drive shaft 66 from the bottom of the metering module lower element 36, then securely engaging the metering module upper element 34 onto the metering module lower element 36 and, finally, securely engaging the directing structure 32 onto the metering module upper element 34. The disassembly of the metering module 14 differs slightly from the assembly in that it starts first with the disassembly of the base plate 40 from the metering module lower element 36, then followed with the disassembly of the rest of the elements in the same sequence as described above.

The discharge module 16 has a substantially funnel-shaped configuration that is generally defined by a wider top input aperture 120, a substantially conical central portion 122 and a narrower bottom output aperture 124.

In turn, both the top input aperture 120 and the bottom output aperture 124 are defined by relatively short cylindrical portions 82 and 83, with the top input aperture 120 having a suitably sized diameter for slidably receiving therein, in a tight-fit relation, a cylindrical bottom portion of the metering module 14.

The inner cylindrical wall of the top input aperture 120 is provided with a correspondingly disposed number of vertically oriented slotted grooves 92 that are in register with the alignment notches 90 protruding from the periphery of base plate 40 described above.

The axial alignment of the top input aperture 120 relative to the bottom output aperture 124 may be slightly offset, as illustrated in the accompanying drawings, or may have any other suitable alignment configuration for the intended application such as, for examples, both input and output apertures 120, 124 being axially aligned or displaying a slight angular offset relative to one another. Furthermore, the bottom output aperture 124 is shown as having a substantially cylindrical shape, but it is to be understood that the port may have any other suitable shape for the intended application such as, for examples, square, rectangular, hexagonal, oval, or the like.

The food dispenser 10 may be installed and ready for operation as follows: the housing of the discharge module 16 is rigidly fastened in a substantially upright attitude to a stationary structure using conventional fastening means (not shown), followed with the lower portion of the metering module 14 that is aligned and inserted through the top input aperture 120 of the discharge module 16, then the food receiving module 12 is inserted on top of a protruding top portion of the metering module 14 and, finally, the power cord 116 and electrical signal cable 118 of the power drive unit 42 and magnetic field sensor 44 respectively are connected to the controller 138, if applicable.

The food dispenser 10 is suitably sized and configured to hold a volume of pelletized dry food that is sufficient to feed the intended animal for a minimum amount of time desired by the operator of the dispenser. Furthermore, the various components of the food dispenser 10 may be made of any suitably rigid material, or materials such as, for examples, plastic resin using a conventional injection molding process, or metal sheet using a multiple punch-press process.

The electrical signal output of a conventional electrical switch coupled to a mechanical actuator, or feed switch actuator (not shown), that is actuated when an animal reaches for the dry food delivered through the discharge module 16 into its feed bowl, may be sent through a suitable electrical cable to the electronic controller 138 that operates the food dispenser 10. The purpose of this electrical signal will be explained in relation with a preferred mode of operation of the food dispenser 10 as described hereinafter.

In a manner readily apparent to one skilled in the art of animal husbandry, a mode of operation of the food dispenser 10 is described as follows: the food receiving module 12 is filled with pelletized dry food, then a suitable scheduling program in the controller 138 associated with the food dispenser 10 is activated. For example, the scheduling program may energize the power drive unit 42 at specified times during the day such that a specified amount of dry food is dispensed through the metering module 14 based on the number of turns accomplished by the impeller 38 counted through the magnet 88 and magnetic field sensor 44 combination.

While the power drive unit 42 is energized, the rotating arms of the impeller 38 act as rotating wipers, or vanes, that dispense food material from the gravity urged food falling through the input ports 60 of the metering module upper element 34, to the dispenser output ports 76 of the metering module lower element 36. Thus, for a given number of turns of the impeller 38, a substantially constant amount of dry food material is dispensed through the bottom output aperture 124 of the discharge module 16. It is to be noted that when the impeller 38 is not rotating, the gravity urged food material is prevented from flowing through the metering module 14 due to the right-angle orientation of the input ports 60 relative to the output ports 76 and the presence of the non-rotating impeller 38 therebetween.

Typically, the controller 138 would be provided with an appropriate monitoring program module that would generate an alarm signal such as, for examples, a visual and/or audio alarm signal, when abnormal conditions are met. For examples, such as when the power drive unit 42 is energized but the output signal of the magnetic field sensor 44 is not changing state, which would mean, for examples, that the impeller 38 is jammed, the motor 102 is defective, or otherwise immobilized for some reasons, or there is an electrical problem with the signal cable 118 or magnetic field sensor 44. Another alarm condition could be generated when an appropriate amount of dry food has been dispensed according to the number of turns accomplished by the impeller 38, but the animal doesn't seem to reach for its feed bowl according to the feed switch actuator (not shown), which might indicate for example that the food receiving module 12 is empty, or the animal is absent or sick, or there is a mechanical or electrical problem with the feed switch actuator itself.

Figure 2:
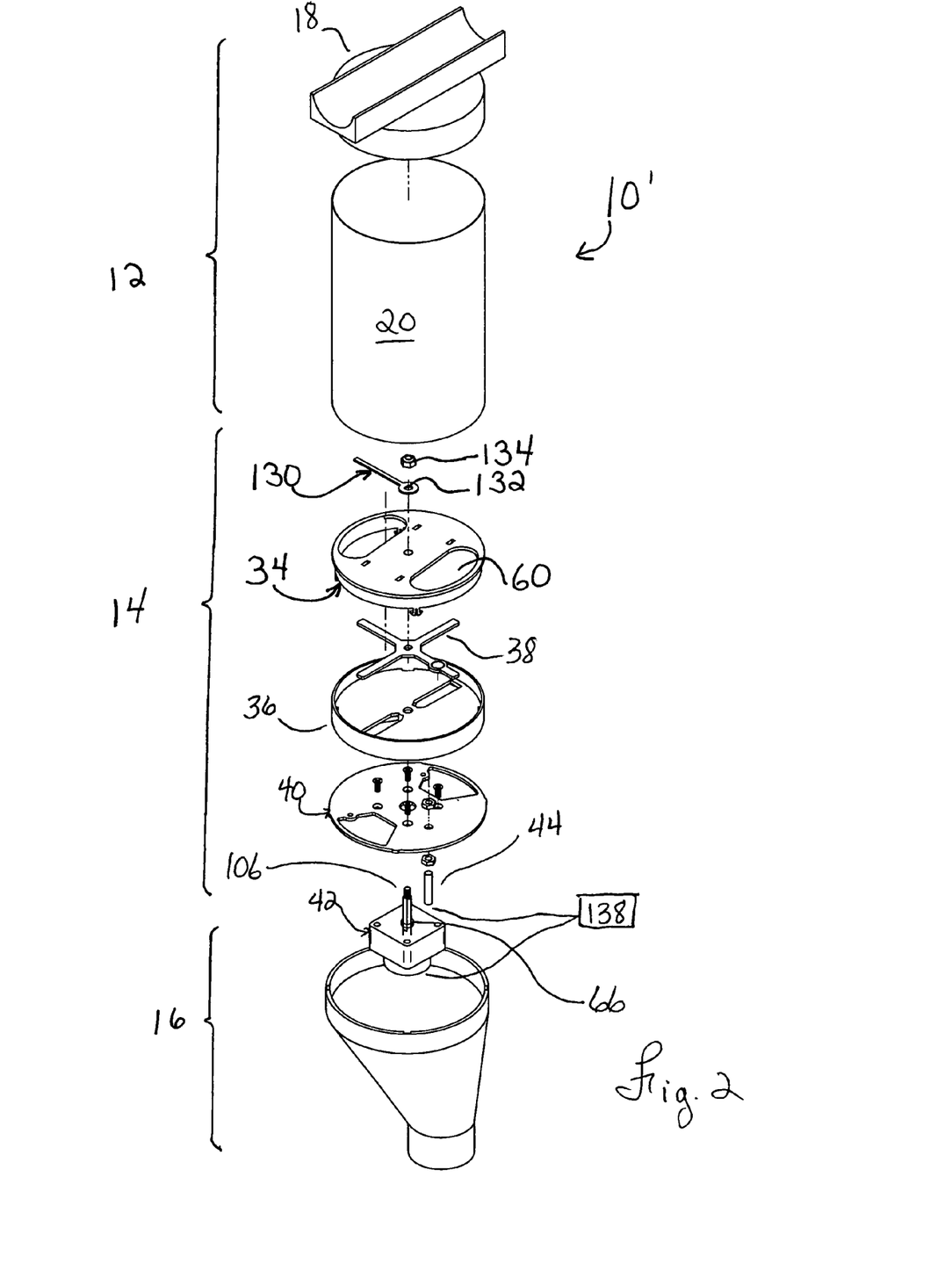
FIG. 2, in an exploded, perspective, view, illustrates a food dispenser according to an alternative embodiment of the present invention, here shown configured to dispense powdered dry food.

FIG. 2 shows an alternate embodiment of the food dispenser 10' that is more appropriately configured for optimized dispensing of powdered dry food for animals. The present embodiment is substantially the same as the first embodiment described above, including a food receiving module 12, a metering module 14 and a discharge module 16. The differences reside in that the directing structure 32 is removed and a radially extending auxiliary arm 130, having one end provided with a compatible D-shaped bore 132, is slid in a tight-fit relation onto the D-shaped portion of the drive shaft 66 that protrudes above the metering module upper element 34, and is secured in place using a suitable tightening nut 134 on the threaded portion 106 of the drive shaft 66. The auxiliary arm 130 is therefore located in the food receiving module 12 and operatively coupled to the impeller 38 for joint rotation therewith to be usable to stir the contents of the food receiving module 12. Thus, with the food receiving module 12 filled with powdered dry food instead of pelletized dry food, it is the auxiliary arm 130 that agitates the feed at the base of the food receiving module 12 in order to inhibit the clogging of the powdered food material nearby, as well as feeding the last portion of powdered food remaining on the central surface of the metering module upper element 34 to both input ports 60 when the food receiving module 12 is nearly empty.

The preferred of operation of this embodiment of the invention is essentially the same as the first embodiment described above, including the disassembly, cleaning and re-assembly procedures associated with the unit.

Although the above description contains many specificities, these should not be construed as limitations on the scope of the invention but as merely providing one illustration of the presently preferred embodiment of this invention. For example, a magnet 88 may be attached, or otherwise integrally embedded in more than one extending arm 84 of the impeller 38 for refining the counting precision of the feed impeller rotations.

Figure 3:
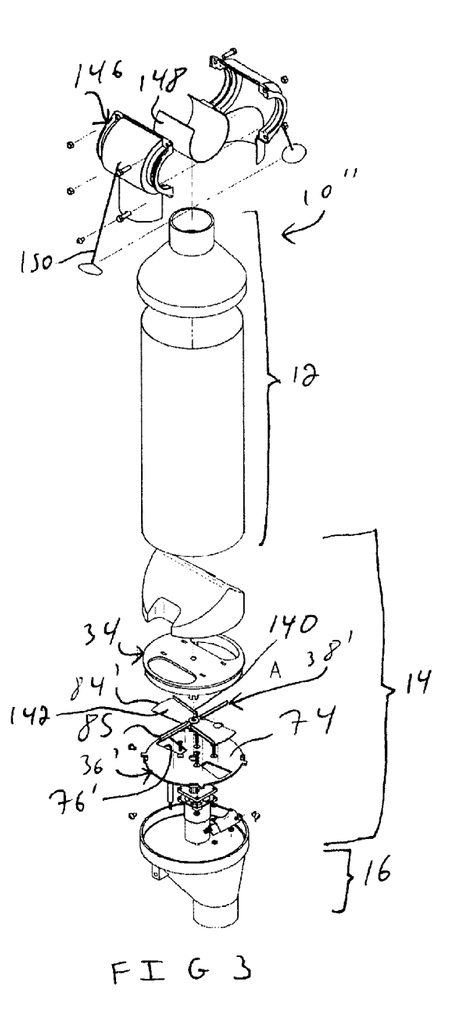
FIG. 3, in an exploded, perspective, view, illustrates a food dispenser according to another alternative embodiment of the present invention, here shown configured to dispense pelletized dry food.
Figure 4:
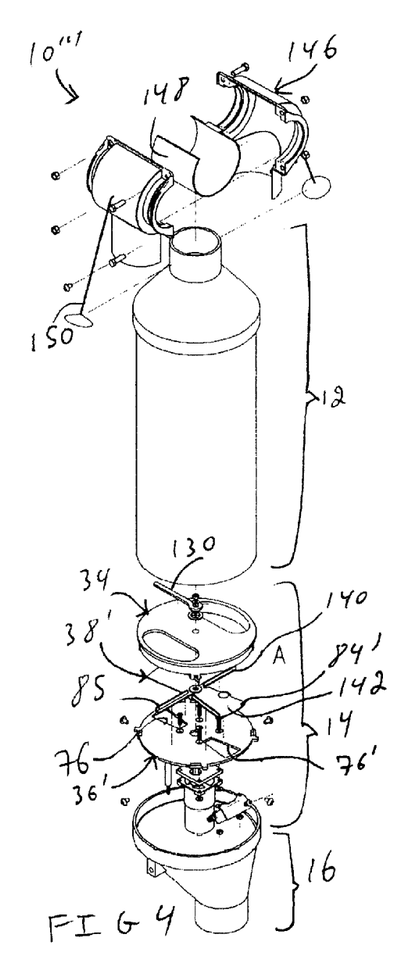
FIG. 4, in an exploded, perspective, view, illustrates a food dispenser according to yet another alternative embodiment of the present invention, here shown configured to dispense powdered dry food.

FIGS. 3 and 4 illustrate yet other embodiments of the invention similar to the embodiments shown respectively in FIGS. 1 and 2, with the exception that the base plate 40 has been omitted and the metering module lower element 36 has been replaced by a metering module lower element 36' that consists essentially of the metering module lower wall 74 and which provides the functionality of the metering module lower element 36 and base plate 40 simultaneously.

Also, the impeller 38 has been replaced by another impeller 38'. The impeller 38' includes four arms 84', 85' that each define a respective vane 140 extending between the metering module upper and lower elements 34 and 36'. At least one of the arms 84', and typically 2 substantially opposed arms 84' each define an obstructing element 142 extending in a substantially parallel and adjacent relationship relative to the metering module lower wall 74, the obstructing element 142 substantially obstructing the output port 76' over a predetermined range of impeller rotation angles. Over the remaining angles, the output ports 76' are not obstructed. This configuration further prevents accidental movements of food through the metering module 14' when the impeller 38' is immobile if the impeller 38' is suitably positioned.

In addition, in FIGS. 3 and 4, a suspension element 146 is usable for selectively suspending the food dispensers 10" and 10''' shown, the suspension elements 146 being well-known in the art and being typically coupled to food carrying elements (not shown in the drawings), such as a conveyor, that conveys the food to numerous food dispensers 10" and 10'''. Yet furthermore, an access door 148 movable between an opened and a closed configuration using a cable 150 is usable for selectively allowing and preventing food moving through the suspension element 146 form entering the food receiving module 12, such mechanisms also being well-known in the art.

Although the present invention has been described hereinabove by way of preferred embodiments thereof, it can be modified, without departing from the spirit and nature of the subject invention as defined in the appended claims.

What is claimed is:

1. A food dispenser for dispensing dry food, said food dispenser comprising:
   a food receiving module for receiving said food;
   a metering module for metering a quantity of said food to dispense, said metering module defining a metering module upper wall, a substantially opposed metering module lower wall and a metering module peripheral wall extending therebetween, said metering module upper wall defining two substantially opposed input ports operatively coupled to said food receiving module for receiving said food therefrom, and said metering module lower wall defining two substantially opposed output ports for releasing said food, said output ports being substantially offset from said input ports when said food dispenser is in an operative configuration for preventing a direct flow of said food between said input and output ports, said metering module including an impeller having at least one arm defining a vane, said impeller being rotatably mounted between said metering module upper and lower walls for rotation in a plane substantially parallel to said metering module lower wall, said metering module also including a power drive unit operatively coupled to said impeller for selectively rotating said impeller;
   a discharge module operatively coupled to said output port for receiving said food from said output port and dispensing said food;
   a directing structure mounted in said food receiving module, said directing structure defining a pair of directing planes diverging from each other, each of said directing plane being inclined toward a respective one of said input ports; and
   an impeller rotation detector operatively coupled to said impeller for detecting a rotation of said impeller when said power drive unit is used to rotate said impeller, said impeller rotation detector including a magnet mounted to said impeller for joint rotation therewith and a magnetic field sensor fixed with respect to said metering module upper and lower walls, said magnetic field sensor being positioned to be substantially in register with said magnet when said impeller reaches a predetermined rotation angle;
   wherein said metering module is configured and sized to discharge a predetermined quantity of said food when said impeller rotates over a predetermined rotation angle;
   whereby said impeller rotation detector detects that said impeller has rotated over said predetermined rotation angle after said power drive unit has been energized to detect dispensing of said predetermined quantity of said food.

2. A food dispenser as defined in claim 1, wherein said predetermined rotation angle is an integer number of impeller rotations.

3. A food dispenser as defined in claim 1, wherein said controller issues an alarm if said predetermined rotation angle has not been reached within a predetermined power drive unit activation duration.

4. A food dispenser as defined in claim 1, further comprising an auxiliary arm located in said food receiving module and operatively coupled to said impeller for joint rotation therewith.

5. A food dispenser for dispensing dry food, said food dispenser comprising:
   a food receiving module for receiving said food;
   a metering module for metering a quantity of said food to dispense, said metering module defining a metering module upper wall, a substantially opposed metering module lower wall and a metering module peripheral wall extending therebetween, said metering module upper wall defining an input port operatively coupled to said food receiving module for receiving said food therefrom, said metering module lower wall defining an output port for releasing said food, said output port being substantially offset from said input port when said food dispenser is in an operative configuration for preventing a direct flow of said food between said input and output ports, said metering module including an impeller having at least one arm defining a vane, said impeller being rotatably mounted between said metering module upper and lower walls for rotation in a plane substantially parallel to said metering module lower wall, said metering module also including a power drive unit operatively coupled to said impeller for selectively rotating said impeller;
   a discharge module operatively coupled to said output port for receiving said food from said output port and dispensing said food;

an impeller rotation detector operatively coupled to said impeller for detecting a rotation of said impeller when said power drive unit is used to rotate said impeller;

wherein said metering module is configured and sized to discharge a predetermined quantity of said food when said impeller rotates over a predetermined rotation angle;

whereby said impeller rotation detector detects that said impeller has rotated over said predetermined rotation angle after said power drive unit has been energized to detect dispensing of said predetermined quantity of said food.

6. A food dispenser as defined in claim 5, wherein said impeller rotation detector includes a magnet mounted to said impeller for joint rotation therewith and a magnetic field sensor fixed with respect to said metering module upper and lower walls, said magnetic field sensor being positioned to be substantially in register with said magnet when said impeller reaches said predetermine rotation angle.

7. A food dispenser as defined in claim 5, further comprising a controller operatively coupled to said power drive unit for energizing said power drive unit when a predetermined condition is met.

8. A food dispenser as defined in claim 7, wherein said controller is operatively coupled to said impeller rotation detector for energizing said power drive unit until said impeller has rotated over said predetermined rotation angle.

9. A food dispenser as defined in claim 8, wherein said predetermined rotation angle is an integer number of impeller rotation.

10. A food dispenser as defined in claim 8, wherein said controller issues an alarm if said predetermined rotation angle has not been reached within a predetermined power drive unit activation duration.

11. A food dispenser as defined in claim 5, wherein said metering module upper wall defines two substantially opposed input ports operatively coupled to said food receiving module for receiving said food therefrom, and said metering module lower wall defines two substantially opposed output ports for releasing said food, said output ports being substantially offset from said input ports when said food dispenser is in an operative configuration.

12. A food dispenser as defined in claim 11, wherein said two input ports are offset from said two output ports by about 90 degrees.

13. A food dispenser as defined in claim 5, further comprising a directing structure mounted in said food receiving module, said directing structure defining a directing plane inclined toward said input port.

14. A food dispenser as defined in claim 5, further comprising an auxiliary arm located in said food receiving module and operatively coupled to said impeller for joint rotation therewith.

15. A food dispenser as defined in claim 5, wherein said impeller includes 4 substantially radially extending arms.

16. A food dispenser as defined in claim 15, wherein each of said arms defines a respective vane extending between said metering module upper and lower walls.

17. A food dispenser as defined in claim 16, wherein at least one of said arms defines an obstructing element extending in a substantially parallel and adjacent relationship relative to said metering module lower wall, said obstructing element substantially obstructing said output port over a predetermined range of impeller rotation angles.

18. A food dispenser as defined in claim 5, wherein said metering module upper and lower walls are substantially planar and substantially parallel to each other.

19. A food dispenser as defined in claim 5, wherein said power drive unit is provided in said discharge module, said food dispenser also comprising an output drive shaft extending between said power drive unit and said impeller through said metering module bottom wall.

20. A food dispenser as defined in claim 19, wherein said power drive unit includes a motor and a gear system provided between said motor and said output drive shaft for changing a rotation speed ratio between said motor and said impeller.

* * * * *